(12) United States Patent
Harris et al.

(10) Patent No.: US 11,082,207 B2
(45) Date of Patent: Aug. 3, 2021

(54) BLOCKCHAIN PLATFORM AS A SERVICE (BPAAS)

(71) Applicant: FIRST GENESIS, INC., Sugar Land, TX (US)

(72) Inventors: Cedric Harris, Sugar Land, TX (US); Ronald Watty, Katy, TX (US)

(73) Assignee: FIRST GENESIS, INC., Houston, TX (US)

( * ) Notice: Subject to any disclaimer, the term of this patent is extended or adjusted under 35 U.S.C. 154(b) by 57 days.

(21) Appl. No.: 16/683,029

(22) Filed: Nov. 13, 2019

(65) Prior Publication Data

US 2021/0143980 A1 May 13, 2021

(51) Int. Cl.
*H04L 9/06* (2006.01)
*H04L 9/08* (2006.01)
*H04L 9/32* (2006.01)
*H04L 29/08* (2006.01)

(52) U.S. Cl.
CPC .......... *H04L 9/0643* (2013.01); *H04L 9/0819* (2013.01); *H04L 9/3247* (2013.01); *H04L 67/02* (2013.01); *H04L 2209/38* (2013.01)

(58) Field of Classification Search
CPC ... H04L 9/0643; H04L 9/0819; H04L 9/3247; H04L 67/02; H04L 2209/38
See application file for complete search history.

(56) References Cited

U.S. PATENT DOCUMENTS

| 7,831,693 B2 * | 11/2010 | Lai | G06Q 10/10 |
| | | | 709/220 |
| 2005/0044197 A1 * | 2/2005 | Lai | H04L 67/16 |
| | | | 709/223 |
| 2021/0125286 A1 * | 4/2021 | Frodigh | G07C 5/008 |

* cited by examiner

*Primary Examiner* — Arvin Eskandarnia
(74) *Attorney, Agent, or Firm* — Dean Nakamura; Robert W. Strozier (57) ABSTRACT

The present invention describes an architecture for increasing the performance of blockchain using a virtual actor model to provide stateful RESful services that are highly scalable and responsive to events as they support publishing and/or subscribing to streaming messages and/or events. The architecture as described leverages established distributed design practices to achieve what would otherwise require costly resource intensive hardware.

20 Claims, 7 Drawing Sheets

Average Throughput
97.5
Hits/s

Avg. Response Time
55
Millisecond

90% Response Time
54
Millisecond

Error Rate
0
%

| Throughput | Avg. of Responses < 1 ms | Min. Response Time < 1ms | Max. Response Time < 1 ms | Error Rate |
|---|---|---|---|---|
| 1,000 Requests/s | 75.70% | 0.0000207 ms | 0.0009990 ms | 0% |

FIG. 9

| Throughput | Avg. of Responses > 1 ms | Min. Response Time > 1ms | Max. Response Time > 1 ms | Error Rate |
|---|---|---|---|---|
| 1,000 Requests/s | 24.30% | 0.0010017 ms | 0.0647042 ms | 0% |

FIG. 10

BLOCKCHAIN PLATFORM AS A SERVICE (BPAAS)

CROSS REFERENCE TO RELATED APPLICATION

This application claims benefit under 35 U.S.C. § 119(e) to U.S. Provisional Application No. 62/731,017, filed Sep. 13, 2019, which is incorporated by reference herein in its entirety.

BACKGROUND OF THE INVENTION

Field of the Invention

The present invention relates generally to mining blockchain contracts in the cloud, and more specifically to an event-based design to scale when consuming multiple requests so as to overcome repetitive and intensive processing of finding a parent Merkle Tree associated with a specific blockchain transaction hash.

Background Information

A blockchain is a continuously growing list of records, called blocks, which are linked and secured using cryptography. Each block typically contains a cryptographic hash linking it to a previous block, and transaction data. For use as a distributed ledger, a blockchain typically is managed by a peer-to-peer network collectively adhering to a protocol for validating new blocks. Once recorded, the data in any given block cannot be altered retroactively without the alteration of all subsequent blocks, which requires collusion of the network majority.

Generalizing, a blockchain is a decentralized, distributed and digital ledger that is used to record transactions across many computers so that the record cannot be altered retroactively without the alteration of all subsequent blocks and the collusion of the network. In a typical blockchain, blocks hold batches of valid transactions that are hashed and encoded into a data structure. In this structure, and as noted above, each block includes the cryptographic hash linking it to the prior block in the blockchain. The linked blocks form a chain. This iterative process confirms the integrity of the previous block, all the way back to the original genesis (or first) block.

Merkle Trees are a way of hashing numerous transactions into a single hash key through a process called mining. The process of mining requires a repetitive process to continually generate hashes in order to update a Merkle Tree. As a block holds batches of numerous transactions that are hashed into a Merkle Tree, mining is seen as the architectural design flaw of the blockchain scalability limitations. While not being bound by theory, it is possible to create a vast block that contains every transaction in a ledger, however doing so would impose additional scalability challenges that put the use of blockchain technology out of the realm of practical utility.

Another key component of blockchain technology is the ability to reliably and independently verify the legitimacy of hashed transaction data within a blockchain. Generating a proof allows hashed data to be anchored to a blockchain thereby proving whether it belongs to a blockchain or not. As with mining, the process of generating proofs is an intensive effort and relies upon a trusted third party accessed by way of, for example, remote RPC or WebAPI requests.

Blockchain technology started as the innovation that powered bitcoin cryptocurrency. However, crytocurrency represents only one vertical for the use of blockchain. In recent years, blockchain has seen wider applications in numerous industries such as finance, supply chain management, medical records management, and ransom ware. The use of mining and anchoring (although necessary) are highly inefficient processes. On a limited application the impact of not being scalable is negligible. However, blockchain technology in its current state is not suitable for widespread use.

What is needed is an architecture that solves scalability challenges without sacrificing the seminal components such as hashing/mining and proofs.

SUMMARY OF THE INVENTION

The systems and methods described herein relate to process transaction verification operations for a decentralized application via virtual actor design architecture, and takes advantage of message contracts to overcome latency issues associated with typical blockchain activities such as mining and proofing.

In embodiments a system is disclosed configured to process transaction verification operations for a decentralized application via virtual actor design architecture, where the system is configured to receive a block related to at least one transaction, the block including a ledger reading set and cryptographic signature associated with the at least one transaction to be authenticated, the system includes a RestBUS API; a ZeroMQ brokerless message queue; a Geth platform configured to port Etherium Framework client and server API from the Go language to C # virtual actors; a ProtoaActor framework; a RedHat OpenShift platform; Kubernetes container orchestration layer; a CochroachDB; and a RedHat dedicated platform, where the architecture facilitates a scalable echo system of stateful actors that operate as an abstraction to blockchain contracts in order to alleviate blockchain mining latency based on a push versus pull/polling of contract messages through the publisher/subscriber message-based architecture.

In one aspect, the system is configured such that incoming web requests arrive over HTTP protocol and activate virtual actor microservicers ported from the Geth Ethenium framework, whereby the virtual actor receives event notifications through ZeroMQ over an extension of the RestBUS API used to alleviate blockchain latency.

In a related aspect, the system is configured such that NoSQL OLAP persistent storage retains virtual actor state in real-time and maintains the blockchain ledger, whereby horizontal scaling of services is achieved through RedHat's operation running inside AWS EC2 Kunernetes clusters that consist of multiple PODS run on virtual machines running containerized application images.

In one aspect, the architecture is configured in a message design pattern, where the messages include JSON, XML, CSV, JSV, ProtoBufm SOAP, MessageWire, HTML, Text, Byte Array, and Streams.

In another aspect, each hash key and parent Merkle Tree hash key of the block is persisted through the virtual actor, whereby a child virtual actor is linked to its parent Merkle Tree root, whereby as a new transaction is added to an existing Merkle Tree, an event-based messaging occurs between a newly spawned child and its parent Merkle Tree.

In a related aspect, the system is configured such that when a parent Merkle Tree receives messages of the of newly added transactions, the parent Merkle Tree updates its corresponding Merkle Tree root hash key, whereby the updated Merkle Tree root hash key is broadcast to all other siblings via event based messaging.

In another aspect, the system is configured to restrict the use of consensus algorithms to actor node discoverability based on (a) the existence and location of node actors within its cluster and (b) Raft consensus algorithms not to agree on transactions.

In one aspect, the system supports both Restful API and Server Sent Event (SSE).

In a related aspect, the system supports RESful API, and wherein the topology of the architecture is configured to be hosted on the Cloud and incorporate a series of decentralized servers via load balancers to distribute REST API traffic across a cluster of containerized virtual actor node masters, whereby communication with a specific virtual actor node is achieved via messaging over a series of RESTful WebAPI connections.

In another related aspect, the system supports SSE, further comprising a persisted TCP/IP connection configured to persist a single bi-directional connection between a client and a virtual node master within a cluster.

In a further related aspect, each virtual actor cluster node communicates with each other via messaging over an SSE persistent connection.

In embodiments, a method of processing transactions for a decentralized application is disclosed, the method being implemented on a computing device including a virtual actor design architecture, where the architecture is configured to receive a block related to at least one transaction, the block including a ledger reading set and cryptographic signature associated with the at least one transaction to be authenticated, the system comprising a RestBUS API; a ZeroMQ brokerless message queue; a Geth platform configured to port Etherium Framework client and server API from the Go language to C # virtual actors; a ProtoaActor framework; a RedHat OpenShift platform; Kubernetes container orchestration layer; a CochroachDB; and a RedHat dedicated platform, where the architecture facilitates a scalable echo system of stateful actors that operate as an abstraction to blockchain contracts in order to alleviate blockchain mining latency based on a push versus pull/polling of contract messages through the publisher/subscriber message-based architecture.

In one aspect, incoming web requests arriving over HTTP protocol activate virtual actor microservicers ported from the Geth Ethenium framework, whereby said virtual actor receives event notifications through ZeroMQ over an extension of the RestBUS API used to alleviate blockchain latency.

In another aspect, NoSQL OLAP persistent storage retains virtual actor state in real-time and maintains the blockchain ledger, whereby horizontal scaling of services is achieved through RedHat's operation running inside AWS EC2 Kunernetes clusters that consist of multiple PODS run on virtual machines running containerized application images.

In a related aspect, messages include JSON, XML, CSV, JSV, ProtoBufm SOAP, MessageWire, HTML, Text, Byte Array, and Streams.

In another aspect, the architecture further includes a plugin module, wherein said module creates a queryable and private permissioned blockchain ledger via ETL configured to aggregate data from disperse data sources and convert said aggregated data into a distributed block chain. In a related aspect, the architecture creates a distributed abstraction of each Etherium contract identified by its contract ID.

In embodiments, a system configured to process transaction verification operations for a decentralized application via virtual actor design architecture, where the system is configured to receive a block related to at least one transaction, the block including a ledger reading set and cryptographic signature associated with the at least one transaction to be authenticated, the system comprising a RestBUS API; a ZeroMQ brokerless message queue; a Geth platform configured to port Etherium Framework client and server API from the Go language to C # virtual actors; a ProtoaActor framework; a RedHat OpenShift platform; Kubernetes container orchestration layer; a CochroachDB; and a RedHat dedicated platform, wherein the system is configured such that incoming web requests arrive over HTTP protocol and activate virtual actor microservicers ported from the Geth Ethenium framework, whereby said virtual actor receives event notifications through ZeroMQ over an extension of the RestBUS API used to alleviate blockchain latency, where the system is configured such that NoSQL OLAP persistent storage retains virtual actor state in real-time and maintains the blockchain ledger, whereby horizontal scaling of services is achieved through RedHat's operation running inside AWS EC2 Kunernetes clusters that consist of multiple PODS run on virtual machines running containerized application images, and where the architecture facilitates a scalable echo system of stateful actors that operate as an abstraction to blockchain contracts in order to alleviate blockchain mining latency based on a push versus pull/polling of contract messages through the publisher/subscriber message-based architecture.

In one aspect, the architecture is configured in a message design pattern, where the messages include JSON, XML, CSV, JSV, ProtoBufm SOAP, MessageWire, HTML, Text, Byte Array, and Streams.

In another aspect, each hash key and parent Merkle Tree hash key of the block is persisted through the virtual actor, whereby a child virtual actor is linked to its parent Merkle Tree root, whereby as a new transaction is added to an existing Merkle Tree, an event-based messaging occurs between a newly spawned child and its parent Merkle Tree, where when a parent Merkle Tree receives messages of the of newly added transactions, the parent Merkle Tree updates its corresponding Merkle Tree root hash key, whereby the updated Merkle Tree root hash key is broadcast to all other siblings via event based messaging.

DETAILED DESCRIPTION OF THE INVENTION

Before the present composition, methods, and methodologies are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "a computer" includes one or more computers, and/or compositions of the type described herein which will become apparent to those persons skilled in the art upon reading this disclosure and so forth.

Unless defined otherwise, all technical and scientific terms used herein have the same meaning as commonly understood by one of ordinary skill in the art to which this invention belongs. Any methods and materials similar or equivalent to those described herein can be used in the practice or testing of the invention, as it will be understood that modifications and variations are encompassed within the spirit and scope of the instant disclosure.

As used herein, "about," "approximately," "substantially" and "significantly" will be understood by a person of ordinary skill in the art and will vary in some extent depending on the context in which they are used. If there are uses of the term which are not clear to persons of ordinary skill in the art given the context in which it is used, "about" and "approximately" will mean plus or minus <10% of particular term and "substantially" and "significantly" will mean plus or minus >10% of the particular term. In embodiments, composition may "contain", "comprise" or "consist essentially of" a particular component or group of components, where the skilled artisan would understand the latter to mean the scope of the claim is limited to the specified materials or steps "and those that do not materially affect the basic and novel characteristic(s)" of the claimed invention.

As used herein, the term "distributed architecture" means components are presented on different platforms and several components can cooperate with one another over a communication network in order to achieve a specific objective or goal.

As used herein, the term "event driven architecture" means a software architecture paradigm promoting the production, detection, consumption of, and reaction to events. An event can be defined as "a significant change in state". For example, when a consumer purchases a car, the car's state changes from "for sale" to "sold".

As used herein, the term "instance" means a concrete occurrence of any object, existing usually during the runtime of a computer program.

As used herein, the term "incarnation" means a separate version of a database. For example, the incarnation of a database changes when you open it with the RESETLOGS option, but you can recover backups from a prior incarnation so long as the necessary redo is available.

Figure 1:
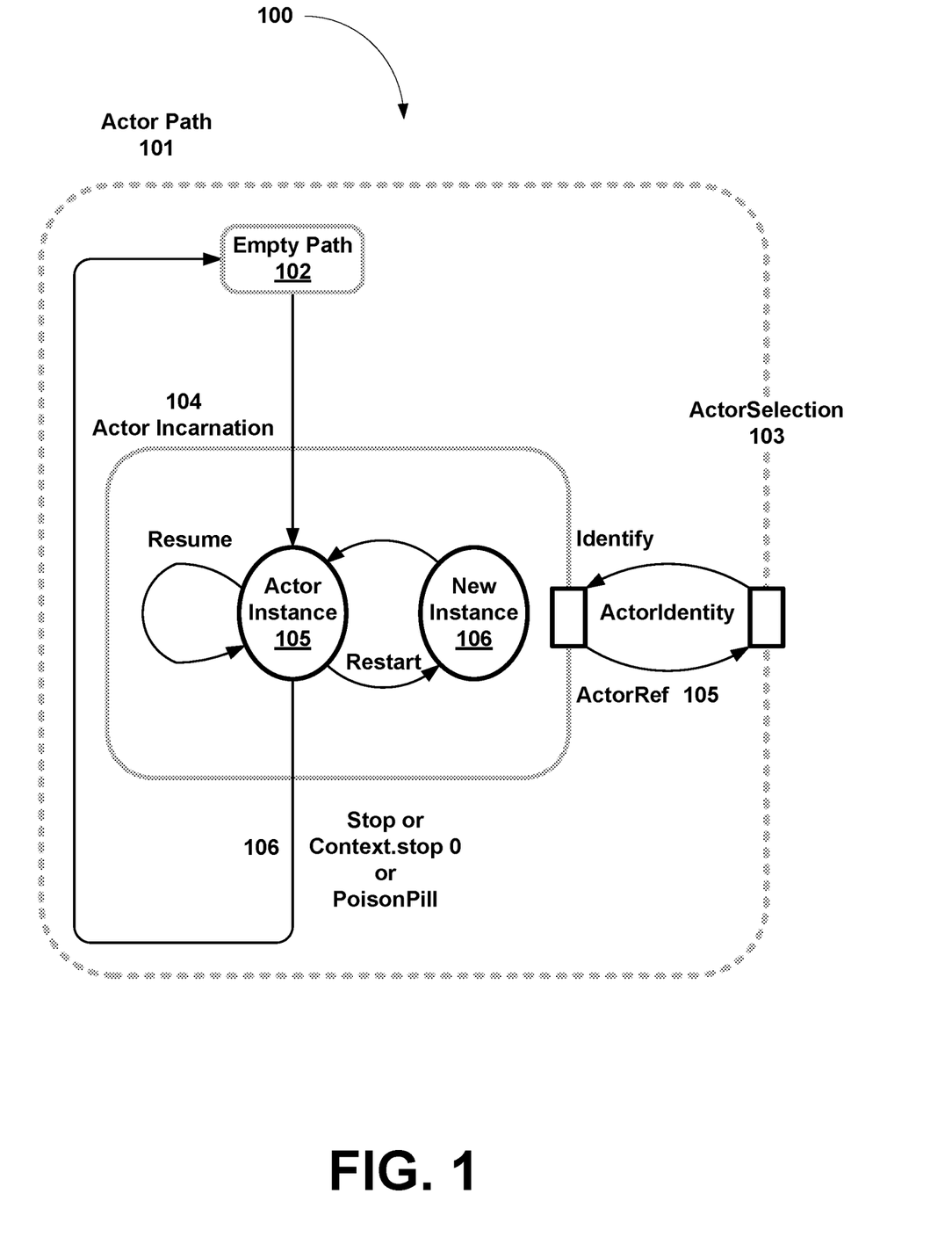
FIG. 1 shows an illustration of how virtual actors work.

As used herein, the term "virtual actor pattern" means a computational model for concurrent or distributed systems in which a large number of these actors can execute simultaneously and independently of each other. Actors can communicate with each other and they can create more actors (see, e.g., FIG. 1, 100). As shown in FIG. 1, ActorPath 101 starts with an empty path 102, where the Actor is assigned to a subject, a path is then reserved for that Actor, a random UID (unique identification) is assigned to an incarnation of the Actor, an instance is created and a preStart is called on the instance. Actor Incarnation 104 belongs to a particular path which has a UID and a mailbox, where a new instance replaces an old instance, postRestart is assigned which calls on a new instance. After new instance starts, preRestart is called on the old instance. Once Actor is identified, Actor selection 103 represents a path (or multiple with wildcard), allows for resolution of the underlying ActorRef 105 by sending an identify message. The ActorRef 105 represents the incarnation, hides the instance, which ActorRef 105 has a path and UID. Finally, a Stop or context.stop is assigned 106. Alternatively, a PoisonPill is activated, depending on the instructions in the message. PostStop is called on the instance, and a path is allowed to be used again.

The problem behind the inherent scalability barriers to blockchain technology is architecture. More specifically, the root problem is lack of distributed architecture. The seminal objective of the blockchain technology was secure transactions through the immutability of its distributed ledgers. Scalability was not the primary objective.

Unsuccessful solutions to blockchain scalability have incorporated everything for Graphical Processing Unit (GPU) farms to large clusters of virtual machines (VMs). The architecture, as disclosed herein, uses several design patterns created specifically for distributed computing to solve scalability challenges denotes as Mobius Blockchain Platform as a Service (BPAAS™). In a related aspect, each design pattern is a compliment to each other and interoperated seamlessly.

Figure 2:
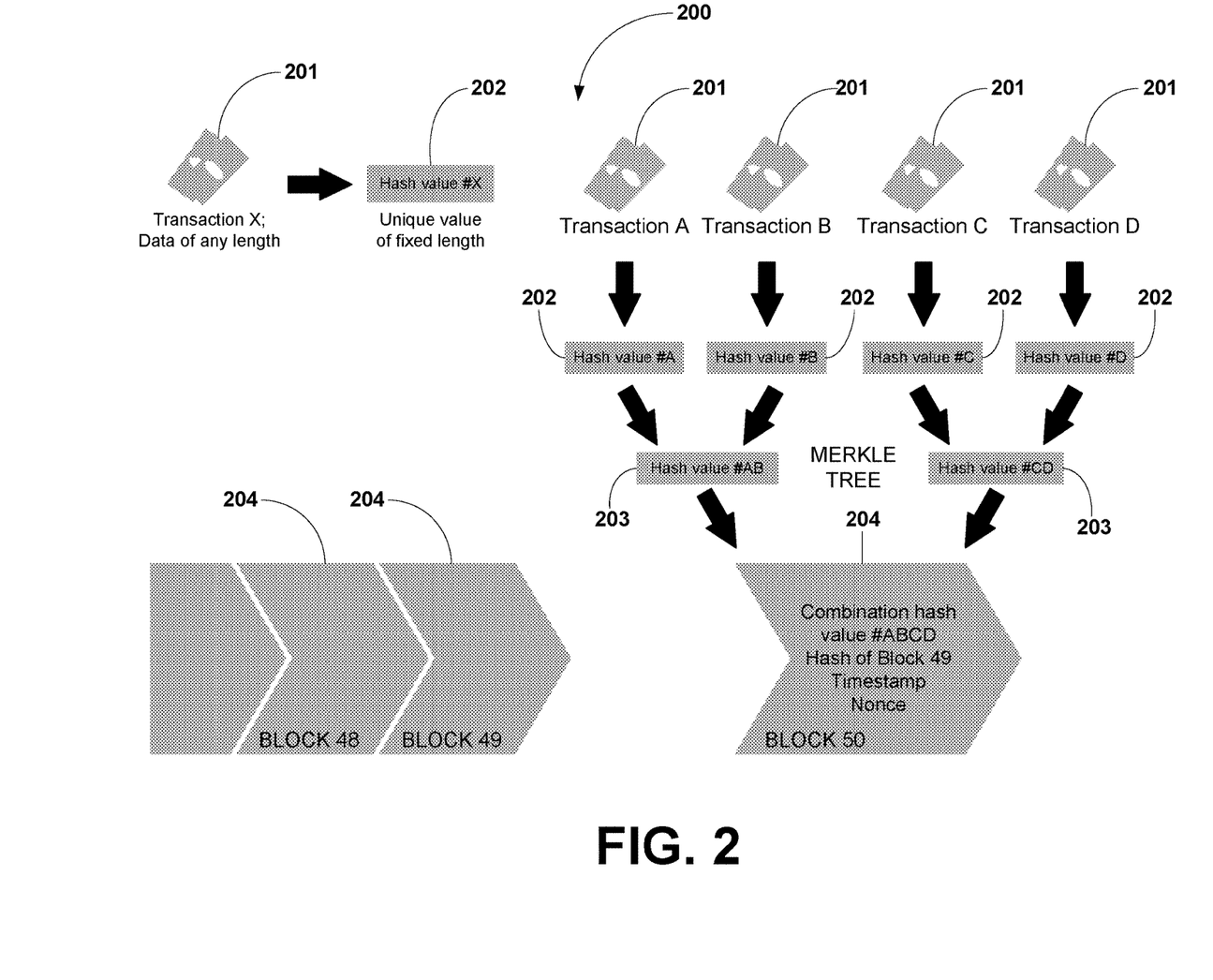
FIG. 2 shows and illustration of a Merkle Tree.

Private or permissioned blockchain networks are far more secure than public blockchain networks. Private blockchain networks require a massive private cloud infrastructure to function at scale. As disclosed herein, the BPAAS™ architecture coupled with a private cloud blockchain network based on the Pivotal.IO platform provide both a highly secure blockchain network with the performance of a public blockchain network. In embodiments, the BPAAS™ adopts an event based model to scale. Although BPAAS™ consumes external requests via standard WebAPI requests, internally, services communicate through event driven architecture at the micro-services level. In a related aspect, this event-driven architecture uses the faster TCP protocol, as opposed to WebAPI traffic over the verbose Http protocol. The present architecture uses an event driven design model in order to alleviate inefficient repetitive and intensive process of finding the parent Merkle Tree (see FIG. 2, 200) associated with a specific blockchain transaction hash. Briefly, transactions 201 are kept in a ledger called a block 204. As new transactions 201 are recorded, this changes the composition of a ledger. To find a particular transaction 201, a Merkle Tree 200 is used. The Merkle Tree 200 consists of hash values 202 and combined hash values 203. The combined hash values (202 and 203), the hash of a previous block 204, time stamp and Nonce are combined to produce a new block 204.

Figure 3:
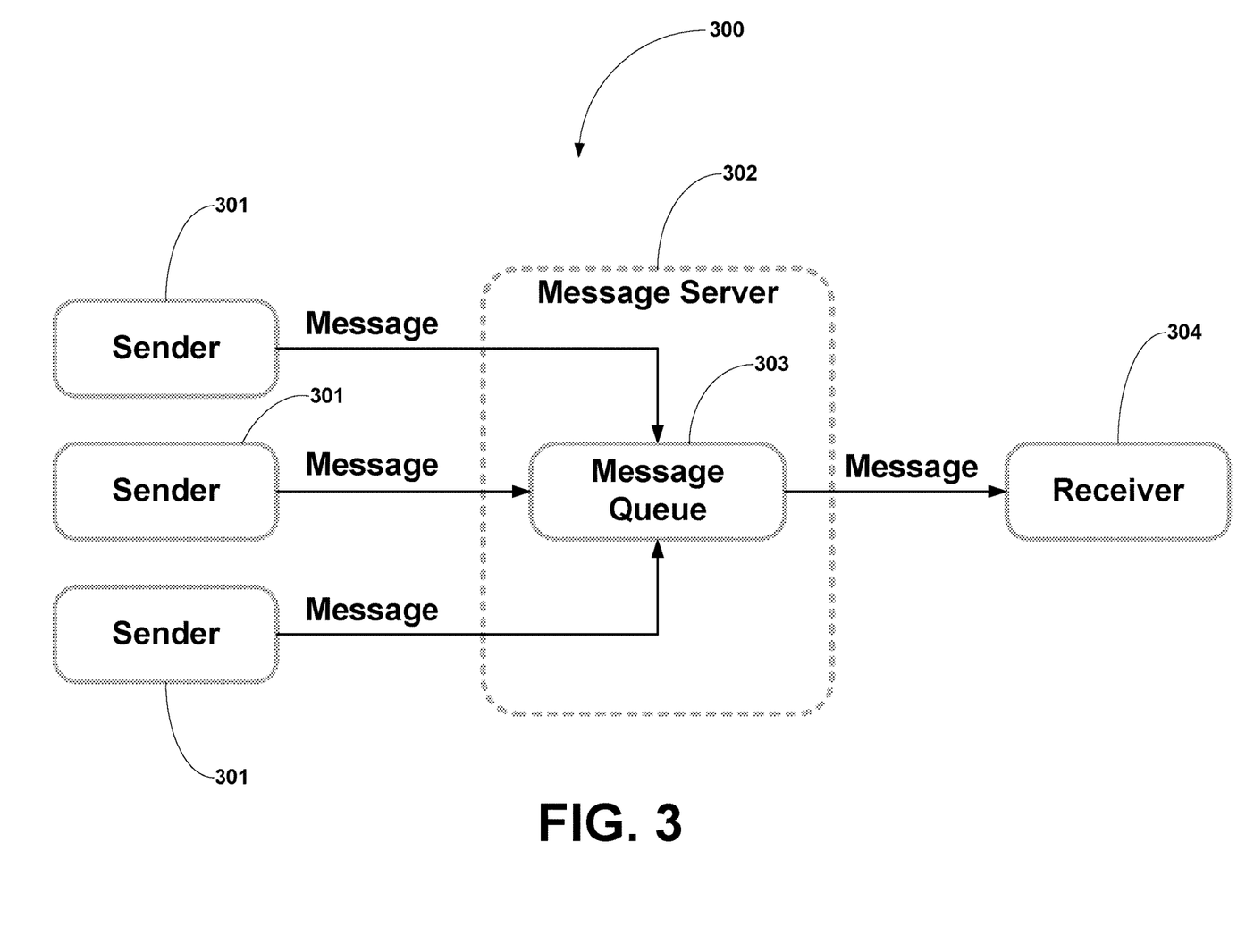
FIG. 3 shows an illustration of messaging architecture.

In embodiments, the BPAAS™ architecture is built on a messaging design pattern (see, e.g., FIG. 3, 300). Briefly, a message is sent from sender 301 to a messaging server 302, where the message enters a message queue 303 to sort incoming message, and finally sent to the appropriate receiver 304. In a related aspect, the envelope messaging may support includes, but is not limited to, JSON, XML, CSV, JSV, SOAP, ProtoBuf, MessageWire, HTML, Text, Byte Array and Streams. In a further related aspect, the default internal messaging of the instant architecture uses a binary serialization format or protocol buffers (e.g., Googles ProtoBuf). Protocol buffers are language-neutral, platform-neutral, extensible mechanisms for serializing structured data, which represent a faster process compared to, for example, XML, which buffers represent a smaller and simpler way to serialize and conduct intra-service communications. For example, ProtoBuf allows one to define how the data is to be structured once, then special generated source code may be used to easily write and read structured data to and from a variety of data streams using a variety of languages.

While most blockchain solutions use numerous containerized service instances and/or GPUs to offload the process intensive work of mining and both creating and validating proofs, the instant architecture as disclosed has adopted a Virtual Actor design pattern to create an abstraction of each blockchain transaction.

Virtual actors are a primitive unit of computation. A key advantage of virtual actors is that they are fast and designed specifically for solving the problem of distributed computing as each mailbox contains a mailbox used in support intra-service communications. Virtual actors are completely isolated and never share memory and are thereby stateful. The stateful aspect of virtual actors allows for each hash key and parent Merkle Tree has key to be persistent and used to link the child virtual actor to its parent Merkle Tree root. As new transactions are added to an existing Merkle Tree, instantaneous event-based messaging occurs between the newly spawned child and its parent Merkle Tree. As a parent Merkle Tree receives messages of newly added transactions, the parent Merkle Tree updates its Merkle Tree root hash key. In turn, this updated Merkle Tree root has key is broadcast to all other siblings via event based messaging. Virtual actors represent a more powerful means of addressing scalability challenges than typical micro-services considering that one can spawn more on a single box that a typical micro-services. As disclosed herein, as virtual actors are spawned, BPAAS™ achieves greater density than relying on numerous containerized service instances and/or GPUs in the cloud.

Subtle vulnerabilities within the seemingly impervious blockchain cyrptography have surfaced. These vulnerabilities arose through the online exchanges where cryptocurrency wallets are stored. In these instances, basic security to safeguard public and private keys would work. However, it is the more sophisticated 51% attack that was the most alarming. In the 51% attack hackers sought to achieve a majority of computing power to control the mining effort that proofs depend on. Simply put, if one gains a majority (51%) of the node computing power in a network then one needs to establish a consensus needed to establish what transactions will become accepted by the minority (49%) of the nodes. The architecture as disclosed herein is based on the Raft consensus algorithm not to agree on transactions, but on the existence and location of node actors within its cluster. By restricting the use of consensus algorithms to actors, node discoverability transactions are never made vulnerable to brute force denial of service attacks such as 51%.

The seminal purpose of the architecture as described herein is to address the fundamental performance issues surrounding blockchain. The fundamental performance issues common to blockchain is its inability to scale. Currently, blockchain can only process a maximum of 15 contracts per minute. This makes widespread adoption of blockchain difficult, at best.

As disclosed herein, the core of the invention is the virtual actor model. The virtual actor model is used to provide stateful RESTful services that are highly scalable and responsive to events as they support publishing/subscribing to streaming messages/events. Instead of querying ("mining") for blockchain contracts, the architecture as disclosed utilizes the virtual actor model to create a distributed abstraction of each Etherium contract uniquely identified by it contract ID. Each virtual actor contract can subscribe to streaming events from a high brokerless message queue (ZeroMQ) in order to push messages to the virtual actor instead of a threaded object using indexing to constantly find contract messages repeatedly, which makes for a highly intensive process requiring resource intensive equipment such as costly highspeed graphical processing unites (GPUs). In other words, the disclosed architecture leverages established distributed design practices to achieve what has thus required costly resource intensive hardware.

Figure 4:
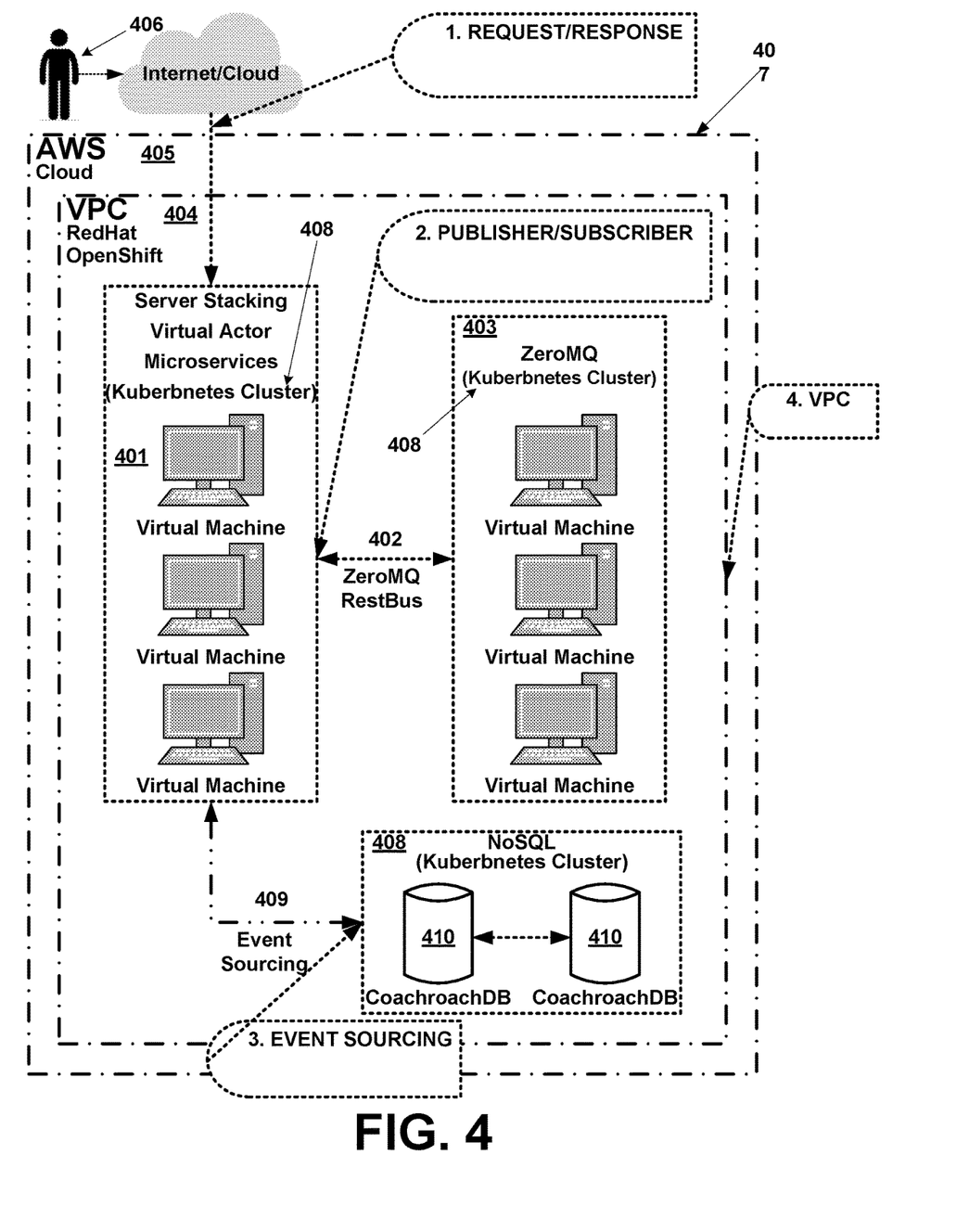
FIG. 4 illustrates the architecture as disclosed.

Referring to FIG. 4, a service stack framework is used to create RESTful distributable message-based microservices over the Request/Response architecture 407. The RestBUS API is used for communicating HTTP requests over message queues versus the HTTP protocol. The ZeroMQ Brokerless message queue 403 is used to leverage the more than 6,000,000 messages per second throughput over publisher/subscriber architecture. The Geth platform is used to port the Etherium framework client and server API from the Go language to C # virtual actors run over a private blockchain where heavy hardware resources are necessary. The Proto-Actor framework is used to provide virtual actor functionality to the Server Stack 401 distributed microservices framework. The RedHat OpenShift platform as a service 404 is used as a thin veneer sitting on top of the Kuberbnetes orchestration layer 408 to both containerize and scale microservices. The Kubernetes container orchestration layer 408 is used to provide clusters management services of the microservices. The CoachroachDB 410 is used to provide highly scalable replicated data storage needed to support highspeed event sourcing of virtual actor state in real-time. The RedHat "dedicated" platform as a service 404 is used to natively run the OpenShift platform as a service inside AWS 405 via multi-talent Virtual Private Cloud (VPC). The C # programming language was used to write the proposed architecture, however, it will be apparent to one of skill in the art that other languages may be used to practice the invention.

In embodiments, referring again to FIG. 4: (1) Request/Response: incoming messages from a user 406 arrive over HTTP protocol activate virtual actor microservices ported from Geth Etherium framework. (2) Publisher/Subscriber: virtual actor contracts receive event notifications through ZeroMQ over an extension of the RestBus API 402 used to alleviate blockchain mining latency 402/403. (3) Event Sourcing: NoSQL QLAP persistent data storage is used to retain virtual actor state in real-time and maintain the blockchain ledger 409. (4) VPC (Virtual Private Cloud): horizontal scaling of services achieved through RedHat's OpenStart 404 running inside AWS EC2 kubernetes clusters 408 that consist of multiple PODS run on virtual machine nodes running containerized application images.

The virtual actor model is used to facilitate a highly scalable echo system of stateful actors to operate as an abstraction to blockchain contracts in order to alleviate blockchain mining latency based on a push versus pull/polling of contract messages through the publisher/subscriber message-based architecture.

In embodiments, a plugin module creates a queryable and private permissioned blockchain ledger by utilizing ETL to aggregate data from disparate data sources and converts that data into a distributed blockchain. In a related aspect, the plugin model utilizes blockchain to provide a layer of security for sensitive data being classified though the BPAAS Support Vector Machine (SVM) algorithms.

In embodiments, plugin modules utilize blockchain smart contracts to perform process automation. In a related aspect, these modules utilize blockchain to provide security between edge devices and the BPAAS cluster. In a further related aspect, the plugin modules utilize blockchain and smart contracts to execute secure payments based immutable workflow events. Moreover, these modules utilize blockchain to provide a layer of security and abstraction between the data user and the data repository.

In embodiments, the architecture as disclosed is capable of supporting two flavors of clients, where each client represents a different use case. Each of BPAAS™ services implement interfaces that support both Restful API (IService) and Service Sent Event (SSE) (IReceiver) which behave in a similar fashion to WebSockets, but are more resilient. The architecture as disclosed herein allows the end-user to select which approach best suits their use case without needing to choose between versions.

The Restful WebAPI connection client use case represents the easiest to implement and most common to consumers of BPAAS™ architecture. For such a client, the topology of the BPAAS™ architecture is hosted in the Cloud and incorporates a series of decentralized serves through the use of load balancers to distribute REST API traffic across a cluster of containerized virtual actor node master. In turn, the virtual actor note masters communicate with a cluster of containerized virtual actor node slaves. Communication with a specific virtual actor node is achieved via messaging over a series of RESTful WebAPI connections.

The persisted TCP/IP connection client use case is reserved for proprietary/embedded systems and requires adoption of the special TCP'IP client to consume the BPAAS™ architecture. For such a client, the topology of the architecture is largely unchanged from the RESTful API connection client with the exception of the persisted TCP/IP connection.

This specialized TCP/IP connection client utilizes Server Sent Events (SSE) technology to persist a single bi-directional connection between the client and a virtual actor node master within the cluster. SSE utilizes long lived HTTP connections and provides lower latency than WebSockets and is not encumbered by the limitations of custom TCP protocols. Essentially, anything that supports HTTP will support SSE, which makes SSE a much simpler choice when needed to get through proxies and firewalls.

Each virtual actor cluster node communicates with each other via messaging over an SSE persisted connection. This client provides the fastest response time for the architecture as disclosed, and is ideal for distributed devices/appliances.

The architecture as disclosed herein is capable of performance metrics that outperform extant blockchain solution. These performance metrics are based on the following virtual machine configuration (see Table 1).

TABLE 1

Performance Metrics

| Parameters | Values |
| --- | --- |
| Virtual Users | 1,000 |
| Transaction Complexity | 1 KV write of size 1,000 bytes |
| StateDB Database | Stateful Virtual Actor with Oracle DB event source |
| Peer Resources | VM 16 CPUs, 112 GB memory, 800 GB ram |
| Block Size | 30 transactions per second and 1,000 transaction per second |

Each virtual actor can process approximately 5,000,000 messages per second during intra-process communications. The virtual actor ecosystem as disclosed herein can produce more than 1,000 blockchain proofs per second.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

The system as disclosed herein may include a plurality of individual components (e.g., computer devices) each programmed with at least some of the functions described herein. In this manner, some components of system may perform some functions while other components may perform other functions, as would be appreciated.

The various components illustrated in FIG. 4 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 4, as well as in other drawing Figures, different numbers of entities than those depicted may be used. Furthermore, according to various implementations, the components described herein may be implemented in hardware and/or software that configure hardware.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference to various features are described that may be preferences or requirements for some implementations, but not other implementations.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

It will be appreciated that an "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein.

The following examples are intended to illustrate but not limit the invention.

EXAMPLES

Example 1

RESTful WebAPI Connection Client

The BPAAS™ architecture's performance and scalability was tested via benchmark testing using the RESTful WebAPI Connection client using the third-party performance testing service BlazeMeter (subsidiary of CA Technologies, New York). BlazeMeter was used to conduct sustained performance tests of 1,000 virtual users requesting blockchain has keys of transaction requests via the BPAAS™ Swagger WebAPI. The objective of the performance tests was to demonstrate the parity in scalability between the average response time (in milliseconds) and the average response time from various geo-locations while conducting highly process intensive tasks such as block chain mining and generating proofs.

Figure 5:
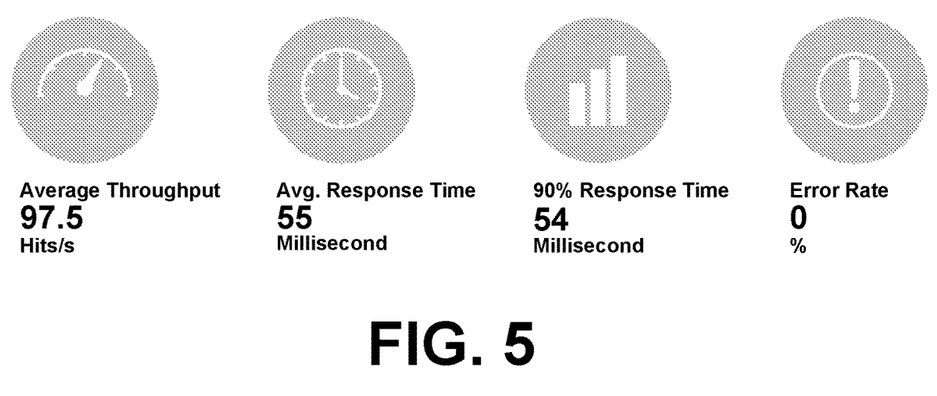
FIG. 5 is a screen shot of BlazeMeter performance summary for 1,000 virtual users hitting Mobius BPAAS™.
Figure 6:
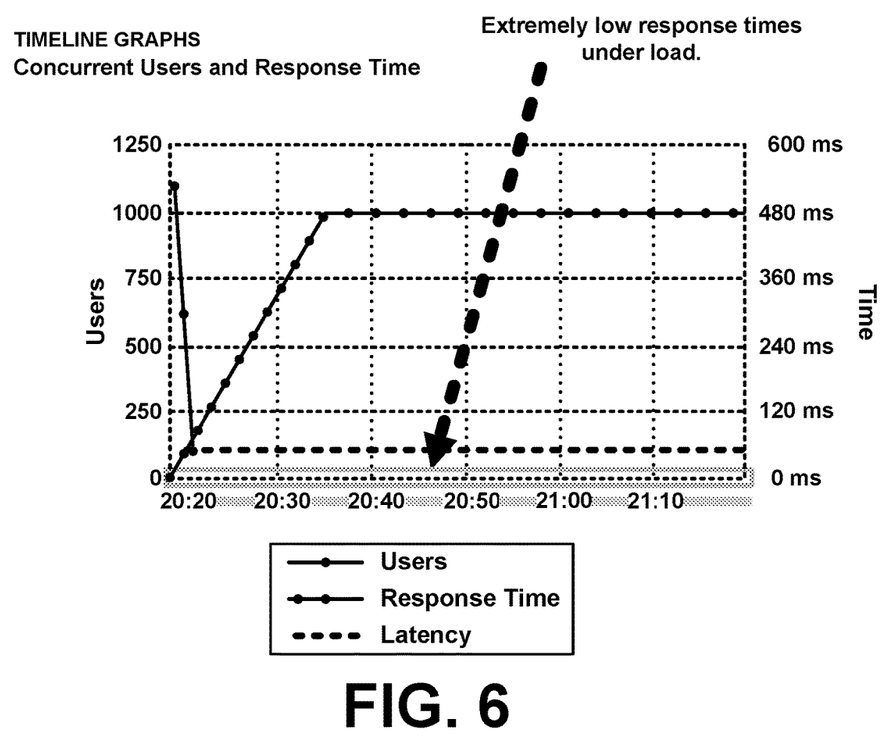
FIG. 6 shows a screenshot of response time metrics as virtual users add load at 100 hits/second. Average response time of 55 milliseconds, <1% CPU utilization.

It was observed that even with traffic spikes as users are added, the average response time of the BPAAS™ architecture remained extremely low over the 56 geo locations. (See FIGS. 5 and 6). Documented Pivotal.IO Virtual Private Cloud (VPC) load balancer latency of 2 milliseconds.

These performance tasks took into consideration inherent latency arriving from several factors that included the following: network loops originating from various cloud providers spanning 56 geo-locations; documented Pivotol.IO Virtual Private Cloud (VPC) load balancer latency of 2 milliseconds.

At 1,000 virtual users the BPAAS™ architecture maintains low response times (seen in bottom, FIG. 6) as the number of users and hits increases to 100 hits per second while performing both blockchain mining and anchoring functions.

Figure 7:
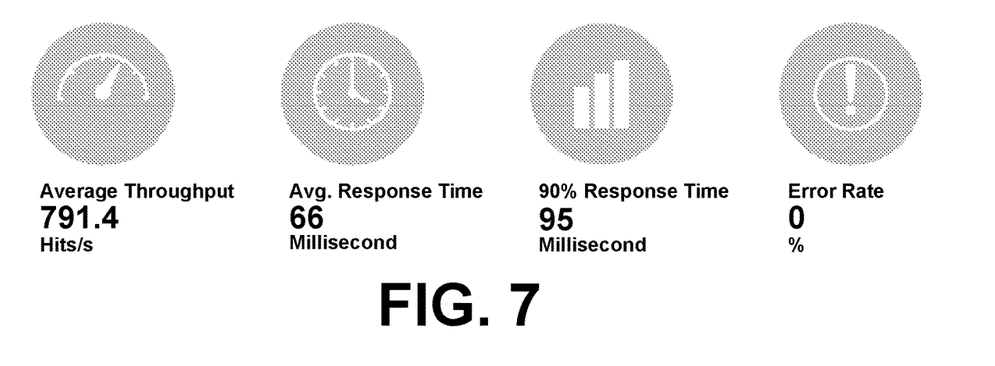
FIG. 7 shows timeline graphs for concurrent users and response time.
Figure 8:
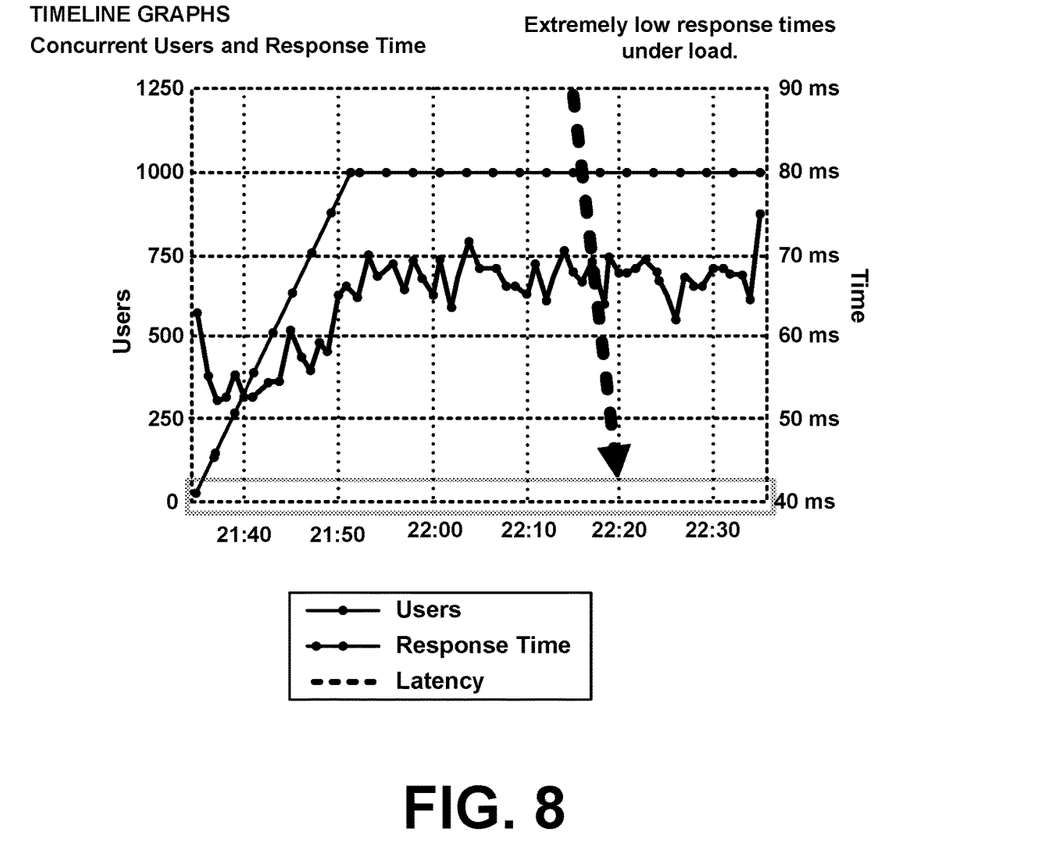
FIG. 8 shows a screen shot of response time metrics as virtual users add load at 1,000 hits/second. Average response time of 66 milliseconds. <2% CPU utilization.

At 1,000 virtual users, the BPAAS™ architecture maintains low response times (see bottom, FIGS. 7 and 8) as the number f users and hits increases to 1,000 hits per second while performing both blockchain mining and anchoring functions.

Example 2

Persisted Connection Client

The BPAAS™ architecture's performance and scalability was tested via benchmark testing using Persisted Connection Client. These tests were conducted using an in-house application. The objective of the performance tests was to demonstrate superior response times of the Persisted Connection Client over the RESTful WebAPI Connection Client while conducting highly process intensive tasks such as blockchain mining and generating proofs.

It was observed that the BPAAS™ architecture remains extremely fast even when supporting persisted TCP/IP connections.

Figure 9:
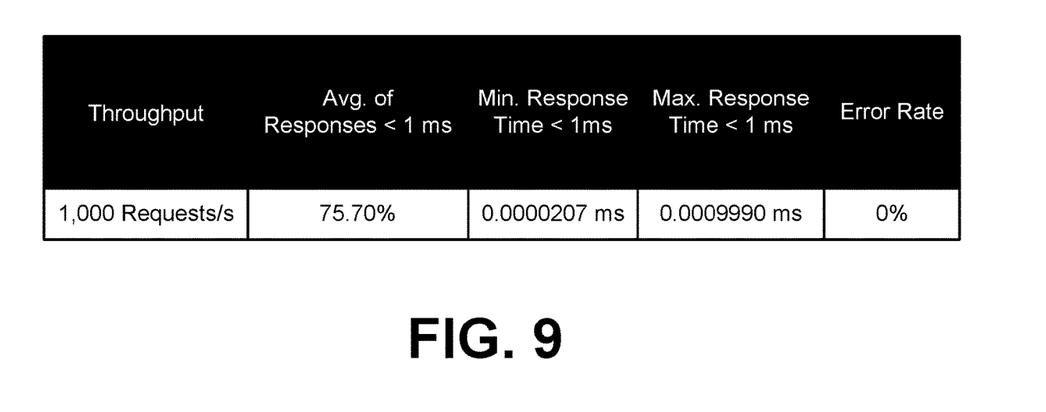
FIG. 9 shows a summary of persisted connection client performance at <1 millisecond. 1,000 hits/second. Fastest response times of 0 filtered out. <2% CPU utilization.
Figure 10:
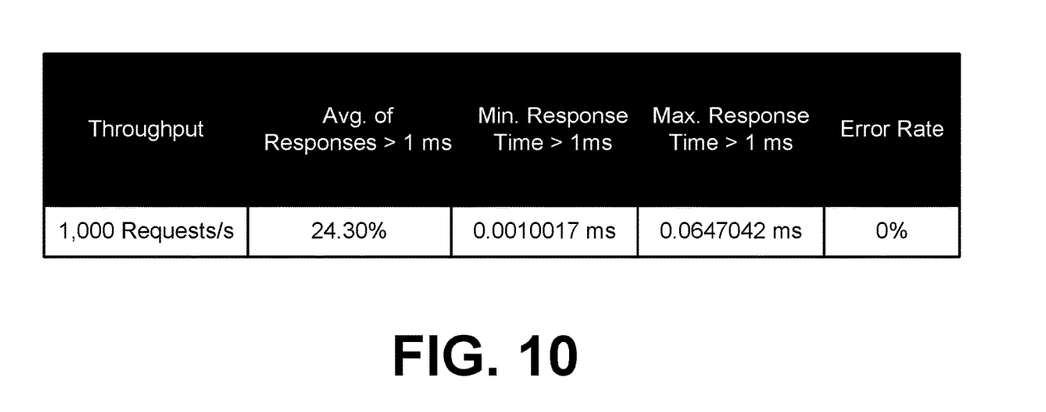
FIG. 10 shows a summary of persisted connection client performance >1 millisecond. 1,000 hits/second. Fastest response times of 0 filtered out. <2% CPU utilization.

The inherent latency is negligible when compared to the response time of the RESTful WebAPI Connection Client. At 1,000 virtual users the BPAAS™ architecture maintains low response time (see FIGS. 9 and 10) as the number of users and hits increase to 1,000 hits per second while performing both blockchain mining and anchoring functions. The fastest response times (appearing as 0.00 milliseconds) were filtered out to demonstrate the significant performance improvement over the RESTful WebAPI Connection Client.

Although the invention has been described with reference to the above examples, it will be understood that modifications and variations are encompassed within the spirit and scope of the invention. Accordingly, the invention is limited only by the following claims.

We claim:

1. A system configured to process transaction verification operations for a decentralized application via virtual actor design architecture, wherein the system is configured to receive a block related to at least one transaction, the block including a ledger reading set and cryptographic signature associated with the at least one transaction to be authenticated, the system comprising a RestBUS API; a ZeroMQ brokerless message queue; a Geth platform configured to port Etherium Framework client and server API from the Go language to C # virtual actors; a ProtoaActor framework; a RedHat OpenShift platform; Kubernetes container orchestration layer; a CochroachDB; and a RedHat dedicated platform, wherein said architecture facilitates a scalable echo system of stateful actors that operate as an abstraction to blockchain contracts in order to alleviate blockchain mining latency based on a push versus pull/polling of contract messages through the publisher/subscriber message-based architecture.

2. The system of claim 1, wherein the system is configured such that incoming web requests arrive over HTTP protocol and activate virtual actor microservicers ported from the Geth Ethenium framework, whereby said virtual actor receives event notifications through ZeroMQ over an extension of the RestBUS API used to alleviate blockchain latency.

3. The system of claim 1, wherein the system is configured such that NoSQL OLAP persistent storage retains virtual actor state in real-time and maintains the blockchain ledger, whereby horizontal scaling of services is achieved through RedHat's operation running inside AWS EC2 Kunernetes clusters that consist of multiple PODS run on virtual machines running containerized application images.

4. The system of claim 1, wherein the architecture is configured in a message design pattern, wherein said messages are selected from the group consisting of JSON, XML, CSV, JSV, ProtoBufm SOAP, MessageWire, HTML, Text, Byte Array, and Streams.

5. The system of claim 2, wherein each hash key and parent Merkle Tree hash key of the block is persisted through said virtual actor, whereby a child virtual actor is linked to its parent Merkle Tree root, whereby as a new transaction is added to an existing Merkle Tree, an event-based messaging occurs between a newly spawned child and its parent Merkle Tree.

6. The system of claim 1, wherein the system is configured such that when a parent Merkle Tree receives messages of the of newly added transactions, the parent Merkle Tree updates its corresponding Merkle Tree root hash key, whereby the updated Merkle Tree root hash key is broadcast to all other siblings via event based messaging.

7. The system of claim 1, wherein the system is configured to restrict the use of consensus algorithms to actor node discoverability based on (a) the existence and location of node actors within its cluster and (b) Raft consensus algorithms not to agree on transactions.

8. The system of claim 1, wherein the system supports both Restful API and Server Sent Event (SSE).

9. The system of claim 8, wherein the system supports RESful API, and wherein the topology of the architecture is configured to be hosted on the Cloud and incorporate a series of decentralized servers via load balancers to distribute REST API traffic across a cluster of containerized virtual actor node masters, whereby communication with a specific virtual actor node is achieved via messaging over a series of RESTful WebAPI connections.

10. The system of claim 8, wherein the system supports SSE, further comprising a persisted TCP/IP connection configured to persist a single bi-directional connection between a client and a virtual node master within a cluster.

11. The system of claim 10, wherein each virtual actor cluster node communicates with each other via messaging over an SSE persistent connection.

12. A method of processing transactions for a decentralized application, the method being implemented on a computing device comprising virtual actor design architecture, wherein the architecture is configured to receive a block related to at least one transaction, the block including a ledger reading set and cryptographic signature associated with the at least one transaction to be authenticated, the system comprising a RestBUS API; a ZeroMQ brokerless message queue; a Geth platform configured to port Etherium Framework client and server API from the Go language to C # virtual actors; a ProtoaActor framework; a RedHat OpenShift platform; Kubernetes container orchestration layer; a CochroachDB; and a RedHat dedicated platform, wherein said architecture facilitates a scalable echo system of stateful actors that operate as an abstraction to blockchain contracts in order to alleviate blockchain mining latency based on a push versus pull/polling of contract messages through the publisher/subscriber message-based architecture.

13. The method of claim 12, wherein incoming web requests arriving over HTTP protocol activate virtual actor microservicers ported from the Geth Ethenium framework, whereby said virtual actor receives event notifications through ZeroMQ over an extension of the RestBUS API used to alleviate blockchain latency.

14. The method of claim 12, wherein NoSQL OLAP persistent storage retains virtual actor state in real-time and maintains the blockchain ledger, whereby horizontal scaling of services is achieved through RedHat's operation running inside AWS EC2 Kunernetes clusters that consist of multiple PODS run on virtual machines running containerized application images.

15. The method of claim 12, wherein said messages are selected from the group consisting of JSON, XML, CSV, JSV, ProtoBufm SOAP, MessageWire, HTML, Text, Byte Array, and Streams.

16. The method of claim 12, wherein the architecture further comprises a plugin module, wherein said module creates a queryable and private permissioned blockchain ledger via ETL configured to aggregate data from disperse data sources and convert said aggregated data into a distributed block chain.

17. The method of claim 12, wherein the architecture creates a distributed abstraction of each Etherium contract identified by its contract ID.

18. An system configured to process transaction verification operations for a decentralized application via virtual actor design architecture, wherein the system is configured to receive a block related to at least one transaction, the block including a ledger reading set and cryptographic signature associated with the at least one transaction to be authenticated, the system comprising a RestBUS API; a ZeroMQ brokerless message queue; a Geth platform configured to port Etherium Framework client and server API from the Go language to C # virtual actors; a ProtoaActor framework; a RedHat OpenShift platform; Kubernetes container orchestration layer; a CochroachDB; and a RedHat dedicated platform, wherein the system is configured such that incoming web requests arrive over HTTP protocol and activate virtual actor microservicers ported from the Geth Ethenium framework, whereby said virtual actor receives event notifications through ZeroMQ over an extension of the RestBUS API used to alleviate blockchain latency, wherein the system is configured such that NoSQL OLAP persistent storage retains virtual actor state in real-time and maintains the blockchain ledger, whereby horizontal scaling of services is achieved through RedHat's operation running inside AWS EC2 Kunernetes clusters that consist of multiple PODS run on virtual machines running containerized application images, and wherein said architecture facilitates a scalable echo system of stateful actors that operate as an abstraction to blockchain contracts in order to alleviate blockchain mining latency based on a push versus pull/polling of contract messages through the publisher/subscriber message-based architecture.

19. The system of claim 18, wherein the architecture is configured in a message design pattern, wherein said messages are selected from the group consisting of JSON, XML, CSV, JSV, ProtoBufm SOAP, MessageWire, HTML, Text, Byte Array, and Streams.

20. The system of claim 18, wherein each hash key and parent Merkle Tree hash key of the block is persisted through said virtual actor, whereby a child virtual actor is linked to its parent Merkle Tree root, whereby as a new transaction is added to an existing Merkle Tree, an event-based messaging occurs between a newly spawned child and its parent Merkle Tree, wherein when a parent Merkle Tree receives messages of the of newly added transactions, the parent Merkle Tree updates its corresponding Merkle Tree root hash key, whereby the updated Merkle Tree root hash key is broadcast to all other siblings via event based messaging.

* * * * *